April 25, 1967   A. J. CARBONE   3,315,872
HERMETICALLY SEALED PLASTIC CONTAINERS
Filed Nov. 2, 1964

INVENTOR
ANTHONY J. CARBONE

BY Plumley, Tyner & Sandt
ATTORNEYS

United States Patent Office 3,315,872
Patented Apr. 25, 1967

3,315,872
HERMETICALLY SEALED PLASTIC
CONTAINERS
Anthony J. Carbone, Midland, Mich., assignor to The
Dow Chemical Company, Midland, Mich., a corporation of Delaware
Filed Nov. 2, 1964, Ser. No. 408,019
3 Claims. (Cl. 229—43)

This invention relates to novel containers that can be sealed hermetically, and more particularly it relates to polystyrene containers with hermetically sealed closures.

A substantial proportion of today's food containers are made of a paper composition which frequently is coated or otherwise treated to reduce the permeability of the paper and to provide an easy means for sealing the package in a closed condition or to provide a means for adhering a wrapper such as cellophane or aluminum foil to the package. Synthetic thermoplastics are now being used to replace paper as the material from which containers may be fabricated. This replacement is going forward for many reasons, among which are (1) the capability of making decorative containers of various designs, (2) the ease of fabricating the container by molding and thereby eliminating the folds and seams which must be used in making containers from sheet materials, (3) the impermeability of the plastic to liquids and to air, and (4) the transparency of many plastics which permits the contents to be seen.

In some applications the lid or cover for a container need only be easily opened and closed and fit the container tight enough to keep out dust and moisture. Covers for such uses are, therefore, frequently made of paper coated with wax or plastic, or they may be made completely of plastic. In any event, the cover is usually sufficiently flexible to withstand the stresses and strains of being removed from the container and replaced on the container several times. Such covers are not, however, capable of hermetically sealing the containers to which they are fitted. Since many foods, beverages, and other substances are best stored in hermetically sealed containers, it is of great importance to provide means for hermetically sealing plastic containers.

It is an object of this invention to provide hermetically sealed plastic containers. It is another object of this invention to provide a means for hermetically sealing containers made of polystyrene. It is still another object of this invention to employ compositions of ethylene/vinyl acetate copolymers for hermetically sealing polystyrene containers. Other objects will appear in the more detailed description of this invention which follows.

The foregoing objectives of this invention are accomplished in accordance with this invention by providing a container made of polystyrene which may be closed by a lid or cover having a "snap-fit" closure means and which may be hermetically sealed by the use of a plastic composition, preferably comprising an ethylene/vinyl acetate copolymer.

The embodiments of this invention may be understood more readily by reference to the attached drawings.

Figure 1:
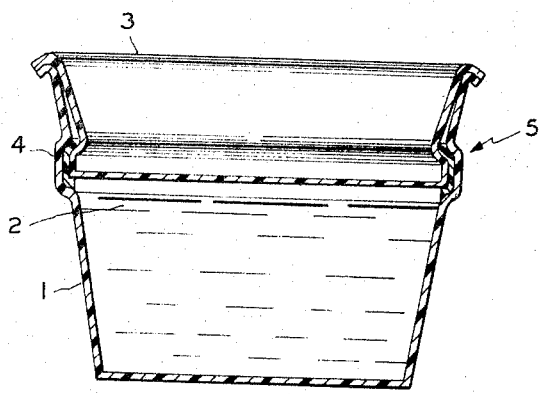
FIGURE 1 is a cross-sectional view of the container of this invention having a cover in place and hermetically sealed to the container.

By reference to FIGURE 1 it may be seen that container 1 is filled with food or other contents 2 and has a cover or lid 3 which is hermetically sealed to container 1 by a substance indicated generally at 4. The critical features of this invention are found in the zone where the container 1 and the cover 3 fit together. This zone is indicated by a reference circle at 5. It is in this zone that the container 1 and cover 3 are so designed as to become mated by means of a snap-fit configuration. This type of closure means is intended to describe any of a variety of alternative devices wherein the cover and the container have mating concave and convex areas which require a slight springing action of one component or the other to open or close the container. In the design shown in FIGURE 1 it may be seen that there is a convex portion at the bottom edge of the cover and a corresponding concave portion in the wall of the container. The outside diameter of the convex portion is slightly larger than the inside diameter of the container at a point immediately above the concave portion in the container wall. Thus when pushing the cover into place, the convex portion of the cover causes the container wall to flex outwardly enough to permit the convex portion to pass beyond the restriction, whereupon the container wall returns to its original unflexed position. If the material from which the container and cover are made has a certain degree of stiffness, the springing action of the container wall when the cover is removed or replaced will be accompanied by a snapping noise. It is intended that within the scope of this invention a "snap-fit" configuration will include any design incorporating the principles shown in the drawing whereby the cover and the container are closed and opened by a springing action which permits the cover to snap into or out of place.

Figure 2:
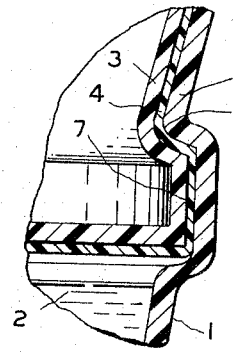
FIGURE 2 is an enlarged partial cross-sectional view of the zone of the snap-fit of this container employing as the sealing means a synthetic thermoplastic film which becomes tacky when heated.

In FIGURE 2 there is an illustration of one design which might be used to produce a hermetically sealed container according to the invention. FIGURE 2 is intended to cover the general area of FIGURE 1 shown in the reference circle at 5. The container 1 filled with contents 2 is closed by means of cover 3. In this instance, the snap-fit is effected by a concave groove in the wall of container 1, matching with a convex portion 7 at the bottom of cover 3. The concave groove of container 1 is terminated at 6 by a shoulder which is smaller in inside diameter than the outside diameter of the convex portion 7. Thus, as cover 3 is removed from container 1 the convex portion 7 will cause shoulder 6 to spring outwardly far enough for convex portion 7 to pass through the constricted area. Shoulder 6 returns to its original position as soon as cover 3 is removed. When cover 3 is replaced on the container so as to close it, the operation will of course be the reverse of those indicated above. In this figure, the hermetic seal is accomplished by means of film 4 which becomes tacky when heated, the preferred film being a copolymer of ethylene/vinyl acetate. This film may be laminated to cover 3 prior to the time when cover 3 is fitted to container 1, or alternatively, film 4 may be placed inside container 1 after it has been filled with contents 2, and cover 3, subsequently put into place to close and seal the container.

The great advantage of employing ethylene/vinyl acetate copolymer in this application is that the composition may be readily heat sealed to polystyrene, the preferred material for container 1 and cover 3. The film may be heat sealed to cover 3 prior to the use of the cover to close a container. At normal temperatures the film will not hinder the positioning of cover 3 in closing container 1, but after the closing has been accomplished, a small amount of heat applied to the outside of the container or cover will cause film 4 to form an airtight and liquid-tight seal between container 1 and cover 3. Furthermore, the seal must be one which can be broken manually leaving the surface of the container substantially unmarred by the breaking of the seal. While other materials are capable of being heat sealed to polystyrene, none is known which will do so with the same facility and convenience and yet provide a hermetic seal which can be manually broken and cleanly stripped from the container when the contents are ready for use.

It is to be understood that ethylene/vinyl acetate copolymer is not the only composition which can be successfully used in this invention. In general, any film which becomes tacky when heated can be employed. The film must, in its tacky state, be capable of being sealed to the polystyrene container, and when the heat sealed film has cooled, it should be capable of being stripped away from the polystyrene container without marring or defacing the surface of the container. Furthermore, the film should be one which can be folded and creased and will remain in the folded position without any evidences of an elastomeric recovery. Some materials are generally unsuited for the film of this invention because, after being creased, the polymer tends to recover from that crease and will not remain in a folded position. Examples of suitable substitute materials are lacquer coated films where the lacquer is a nitrocellulose base material and the film is unoriented polystyrene, moistureproof cellophane, polypropylene, or polyethylene terephthalate. While these substitute materials may perform satisfactorily in some embodiments of this invention, it is to be understood that only the ethylene/vinyl acetate copolymer has all of the advantages which are desired for sealing a container of polystyrene, and accordingly this combination is preferred.

Figure 3:
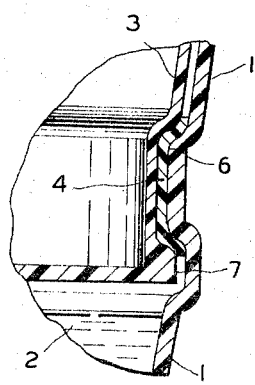
FIGURE 3 is an enlarged partial cross-sectional view of the zone of the snap-fit of this container employing a cold-flowable plastic material in the form of a gasket as the sealing means.
Figure 4:
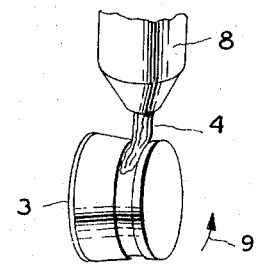
FIGURE 4 is a schematic illustration of one method of applying the gasket composition to the cover of FIGURE 3.

In FIGURE 3 there is shown an alternative to that of FIGURE 2. In one regard the design is different in that the cover 3 has a concave portion mating with a convex portion on the walls of container 1. This, it will be noted, is exactly the opposite of that described with respect to FIGURE 2. A second difference is that the material used to effect the seal is not a film but is a softenable gasket composition which has been applied to the area of the snap-fit as a molten material. This embodiment of the invention has a particular advantage in the fabrication and filling of containers as illustrated in FIGURE 4 in which cover 3 is positioned at a right angle to its normal orientation, and a molten gasketing composition, preferably containing a substantial portion of ethylene/vinyl acetate copolymer, is extruded from device 8 as shown in FIGURE 4 into the convex groove of cover 3 as the cover is rotated in the direction of arrow 9. It will be readily apparent to those skilled in the art that this means of application provides a method which is readily incorporated into a production line for making and filling containers. The preferred sealing composition is one in which the ethylene/vinyl acetate copolymer comprises about 50% by weight of the total mixture and the remaining 50% is a microcrystalline wax. This mixture is readily melted and therefore may be extruded at a relatively low temperature with somewhat simplified machinery, and at the same time, there is sufficient ethylene/vinyl acetate in this composition to effect an excellent heat seal between the polystyrene of the container and of the cover.

In the embodiment of this invention as shown in FIGURES 3 and 4 it is not necessary that the sealing material actually be heat-sealed to either the container or to the cover. It is entirely possible that a hermetic seal can be produced by means of a gasket material. For this purpose, the sealing material must be soft enough to move by cold-flow and fill all of the space between the cover and the container in the area of the seal. Any waxy composition can function as a gasket, and this includes materials such as microcrystalline wax and hydrocarbon polymers such as medium and low density polyethylene. It is to be understood, however, that because cold-flowing compositions of ethylene/vinyl acetate can be heat-sealed to polystyrene, such compositions in which ethylene/vinyl acetate constitutes a substantial portion of the whole are preferred.

The snap-fit shown in FIGURE 3 functions similarly to that described above, although in this instance, the outside diameter of the cover 3 at the position indicated at 7 causes the container wall at 6 to spring outwardly and to be released in such a fashion that the wall at 6 is heat sealed to cover 3 by means of composition 4.

Other designs and configurations of containers will be apparent to those skilled in the art of this industry. It is not intended that the container of this invention nor the seal employed in that container be limited by the drawings nor by the description of the preferred designs. This invention is not intended to be restricted in any fashion other than that found in the appended claims.

What is intended to be claimed is:

1. A hermetically sealed container comprising (1) a polystyrene, unitary container body having an opening, (2) a polystyrene unitary closure adapted to close said opening by a snap-fit means comprising mating convex portions and concave portions on said container body and on said closure whereby said container body or said closure is subjected to a springing action when said closure is applied to, and removed from said container body, and (3) a hermetic seal consisting essentially of an ethylene/vinyl acetate copolymer composition between said container body and said closure in the zone of said snap-fit means.

2. The container of claim 1 in which the said hermetic seal is a film of ethylene/vinyl acetate copolymer composition laminated to said closure.

3. The container of claim 1 in which said hermetic seal is a composition comprising ethylene/vinyl acetate copolymer and microcrystalline wax.

References Cited by the Examiner
UNITED STATES PATENTS

| | | | |
|---|---|---|---|
| 3,025,167 | 3/1962 | Butler. | |
| 3,070,275 | 12/1962 | Bostrom. | |
| 3,079,057 | 2/1963 | Colarusso | 229—43 X |
| 3,173,571 | 3/1965 | Csermy et al. | 229—43 X |
| 3,194,479 | 7/1965 | Rumberger | 229—43 |

GEORGE O. RALSTON, *Primary Examiner.*